United States Patent
Kurz et al.

(10) Patent No.: US 6,276,711 B1
(45) Date of Patent: Aug. 21, 2001

(54) QUICK DISCONNECT FEATURE FOR SNAP-IN DRIVER AIR BAG MODULE

(75) Inventors: Scott A. Kurz, Waterford; Aaron B. Levine, West Bloomfield, both of MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/535,606

(22) Filed: Mar. 27, 2000

(51) Int. Cl.⁷ .................................................. B60R 21/20
(52) U.S. Cl. ........................ 280/728.2; 280/731; 74/552
(58) Field of Search ................. 280/728.2, 731; 74/552

(56) References Cited

U.S. PATENT DOCUMENTS

| 5,046,757 | * | 9/1991 | Sadler et al. ........................ 280/731 |
| 5,087,069 | * | 2/1992 | Corbett et al. ....................... 280/731 |
| 5,380,037 | * | 1/1995 | Worrell et al. ....................... 280/731 |
| 5,470,100 | * | 11/1995 | Gordon ............................. 280/728.2 |
| 5,775,725 | * | 7/1998 | Hodac et al. ...................... 280/728.2 |
| 5,855,449 | * | 1/1999 | Thomas ................................. 74/552 |
| 6,082,758 | * | 7/2000 | Schenck ............................ 280/728.2 |

FOREIGN PATENT DOCUMENTS 197 25 684-C1 * 12/1998 (DE).

* cited by examiner

*Primary Examiner*—Lanna Mai
*Assistant Examiner*—Ruth Ilan
(74) *Attorney, Agent, or Firm*—Markell Seitzman

(57) ABSTRACT

An air bag module for a steering wheel includes an inflator, cushion, retainer ring, cover and a mounting plate with snap-in attachment studs. A wire spring fastening system is used to secure the module to the steering wheel. The system includes a retainer mechanism and a serpentine engagement wire which engages notches in the snap-in attachment studs. The retention mechanism also includes an alignment guide that is used with a disassembly tool to remove the air bag module from the steering wheel.

12 Claims, 5 Drawing Sheets

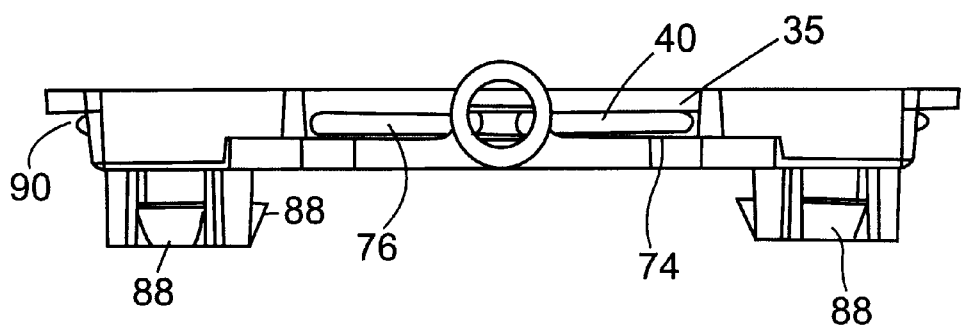
Fig. 7
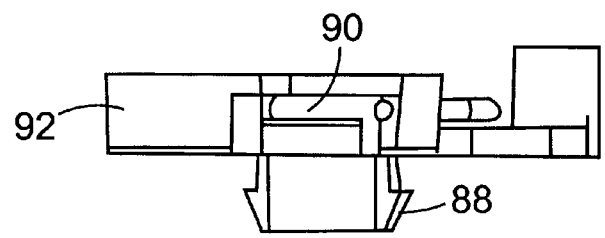
Fig. 8
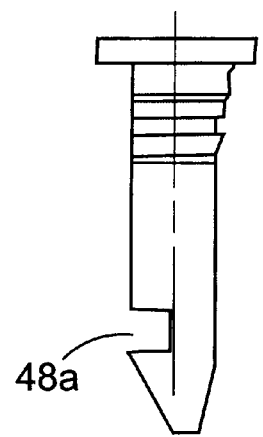 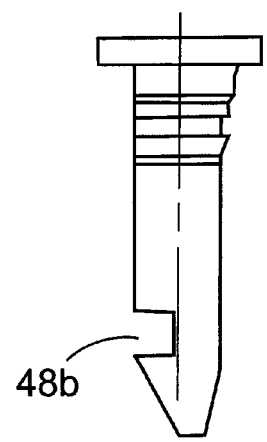
Fig. 9a          Fig. 9b

QUICK DISCONNECT FEATURE FOR SNAP-IN DRIVER AIR BAG MODULE

BACKGROUND AND SUMMARY OF THE INVENTION

The present invention relates to a driver's air bag module and related methods for assembly and use. More particularly, the invention is directed towards an air bag module with a housing for direct attachment to a vehicle's steering wheel.

Commonly, driver's side air bag modules have a cover for enclosing a cushion and inflator. Typically, the cushion inflator and cover are fixably mounted to the housing, the housing having a number of fasteners to attach the air bag module to a vehicle's steering wheel.

The associated housing functions as a stable surface for enclosing the cushion pack assembly and for the absorption of the deployment reaction forces. This housing is often used to couple the air bag module to the steering column. It is known that the housing can have a plurality of notched studs, which are used to fixably engage the air bag module to the steering wheel assembly. Other driver air bag systems currently available, including snap-in module systems, tend to be cumbersome and difficult to remove from the wheel. As such, a system which allows for the easy insertion and removal of the driver air bag module would significantly reduce the cost and increase the ease of manufacturing in the vehicle assembly plant and improve ease of serviceability.

In accordance with the teachings of the present invention, a driver's air bag module of a vehicle's safety restraint system is provided. The module has improved mounting hardware that allows for the utilization of a steering wheel's armature to secure the module and allow for the proper distribution of reaction forces. A wire spring fastening system is used to secure the module to the steering wheel.

In view of the foregoing, it is an object of the present invention to provide an improved driver's air bag module for a vehicle safety restraint system that may be quickly removed from a vehicle for repair or replacement.

Additional advantages and features of the present invention will become apparent from the subsequent description and appended claims, taken in conjunction with the accompanying drawings.

BRIEF DESCRIPTION OF THE DRAWINGS

FIGS. 5–8 are views of the retention mechanism of the current invention; and

FIGS. 9a and 9b show the snap-in stud of the current invention.

DETAILED DESCRIPTION OF THE INVENTION

Figure 1:
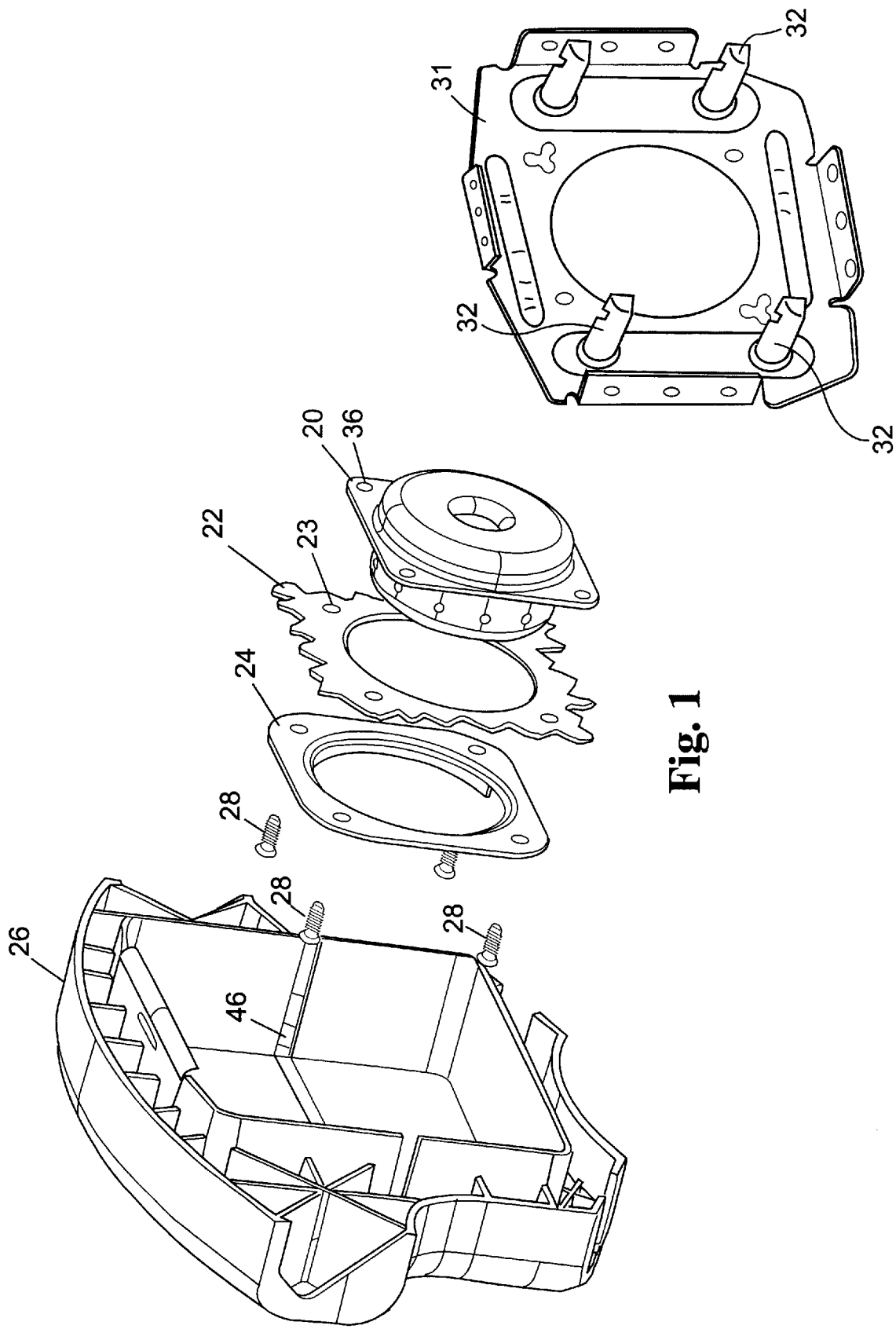
FIG. 1 is an exploded view of the driver air bag module according to the current invention.
Figure 4:
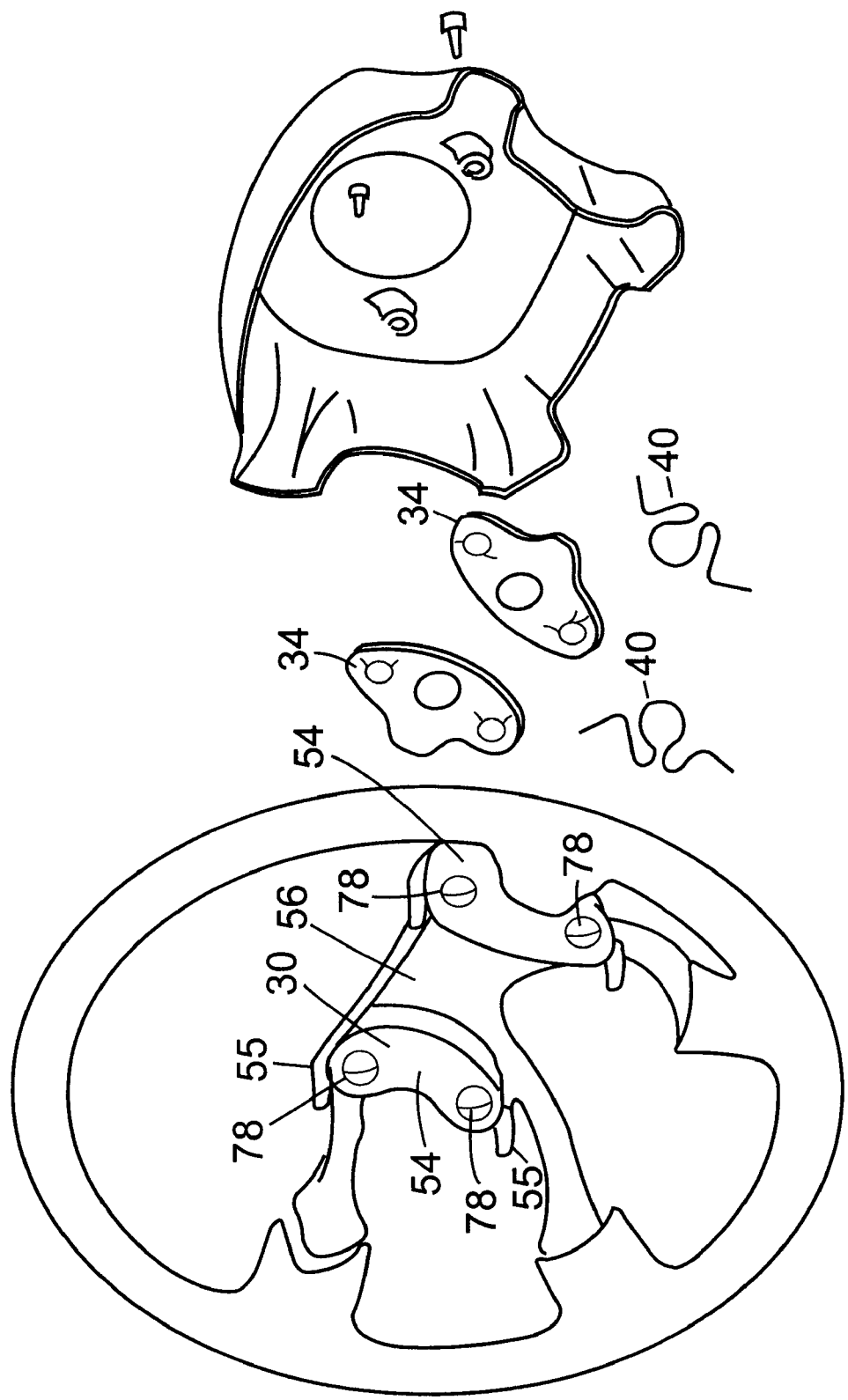
FIG. 4 is an exploded view of the steering wheel and retainer mechanism of the current invention.

As is shown in FIGS. 1 and 4, the present invention is comprised of eight primary components: an inflator 20, a cushion 22, a retainer ring 24, a cover 26, a mounting plate 31, a plurality of snap-in attachment studs 32, the steering wheel armature 30, and a pair of retaining mechanisms 34.

An air bag module subassembly 29 is assembled by placing the retainer ring 24 within the cushion 22 so that its threaded studs 28 pass through openings 23 in the neck of the cushion. The threaded studs 28 on the retainer ring 24 are then passed through corresponding holes 36 on the inflator 20. The studs can be secured to the ring 24 or loosely received therethrough.

Figure 2:
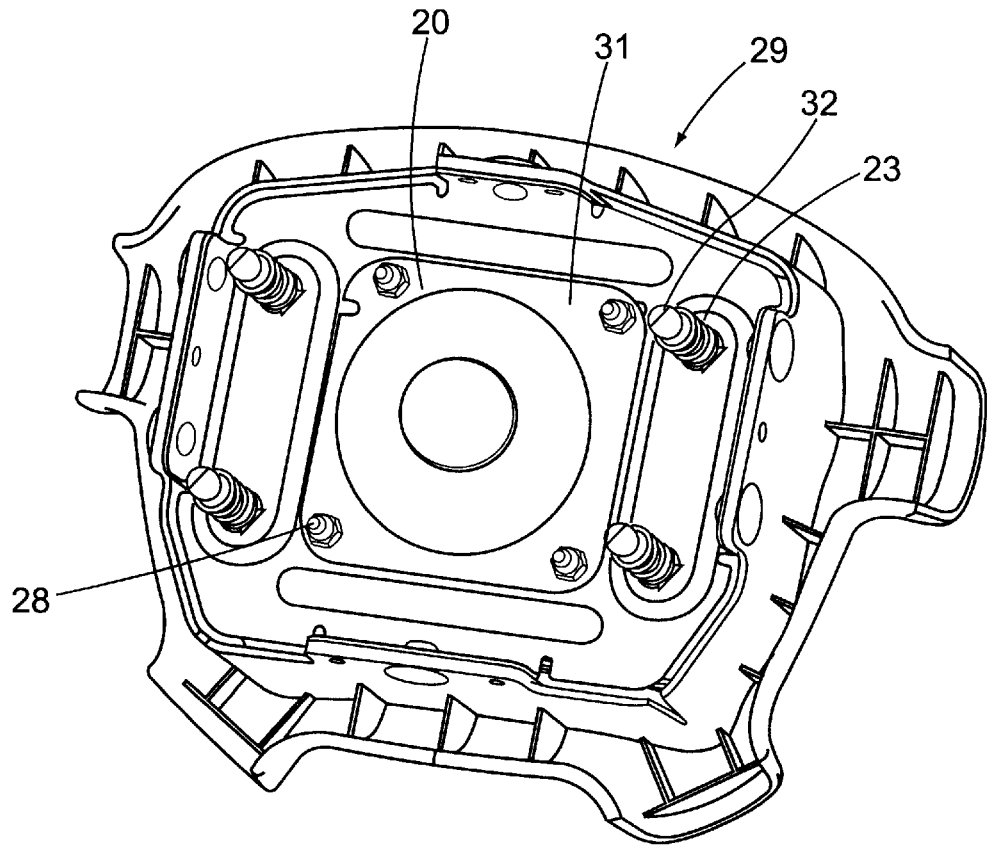
FIG. 2 is an air bag module subassembly of the current invention.
Figure 3:
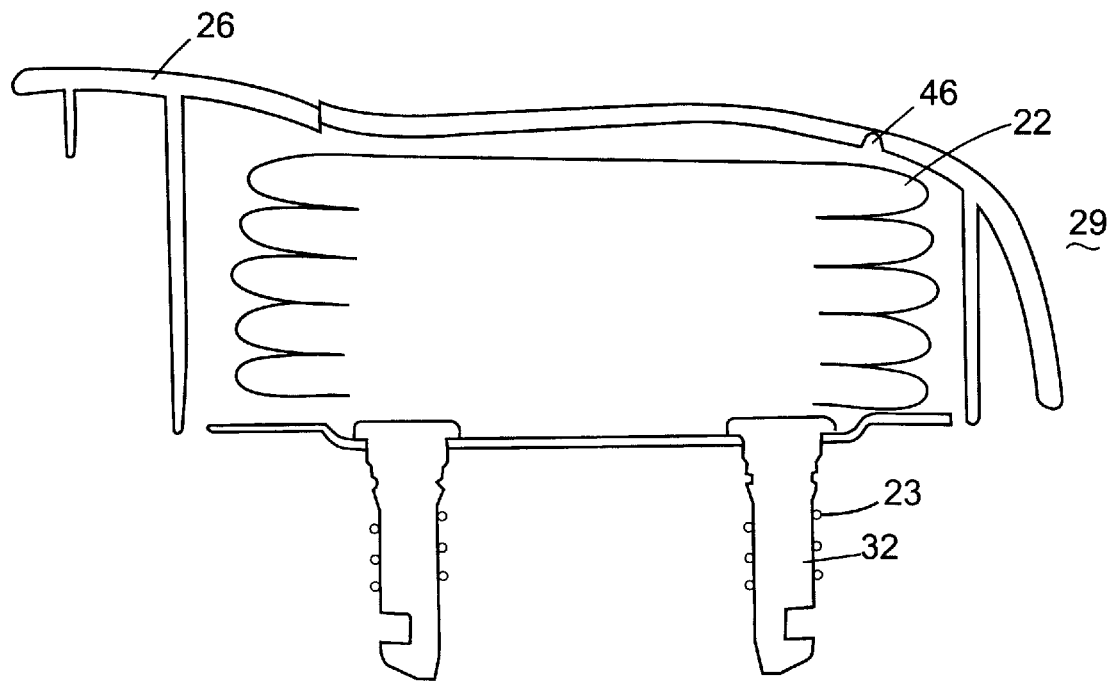
FIG. 3 is a cross section of the subassembly as seen in FIG. 2.

The cushion 22 is then folded and placed onto the mounting plate 31 within the cover 26 as is shown in FIGS. 2 and 3. As is known, an optional layer of Tyvek or shrink-wrap polymer can be wrapped around the cushion 22 after it is folded to prevent contaminants from entering the bag pack. The snap-in attachment studs 32, which are swaged into the mounting plate 31, serve to stably fix the air bag module subassembly 29 to the steering wheel armature 30. During a deployment, the air bag module subassembly 29 is designed so that the snap-in attachment studs 32 function to prevent movement of the mounting plate 31 with respect to the steering wheel armature 30. As best seen in FIGS. 1 and 3, a tear seam 46 is placed through the entire center of the cover so allowing the cushion to deploy therethrough.

With the module in the configuration shown in FIG. 2, it is ready for shipment to an auto manufacturer's assembly plant. At the assembly plant, the steering wheel armature 30 is first fastened to the steering shaft. Then, the driver air bag module 29 of the current invention is connected to the steering wheel assembly by first making the required electrical connections and then snapping the air bag module subassembly 29 into the steering wheel armature 30. The retaining mechanisms 34 are disposed on the rear surface of the steering wheel armature 30.

Figure 5:
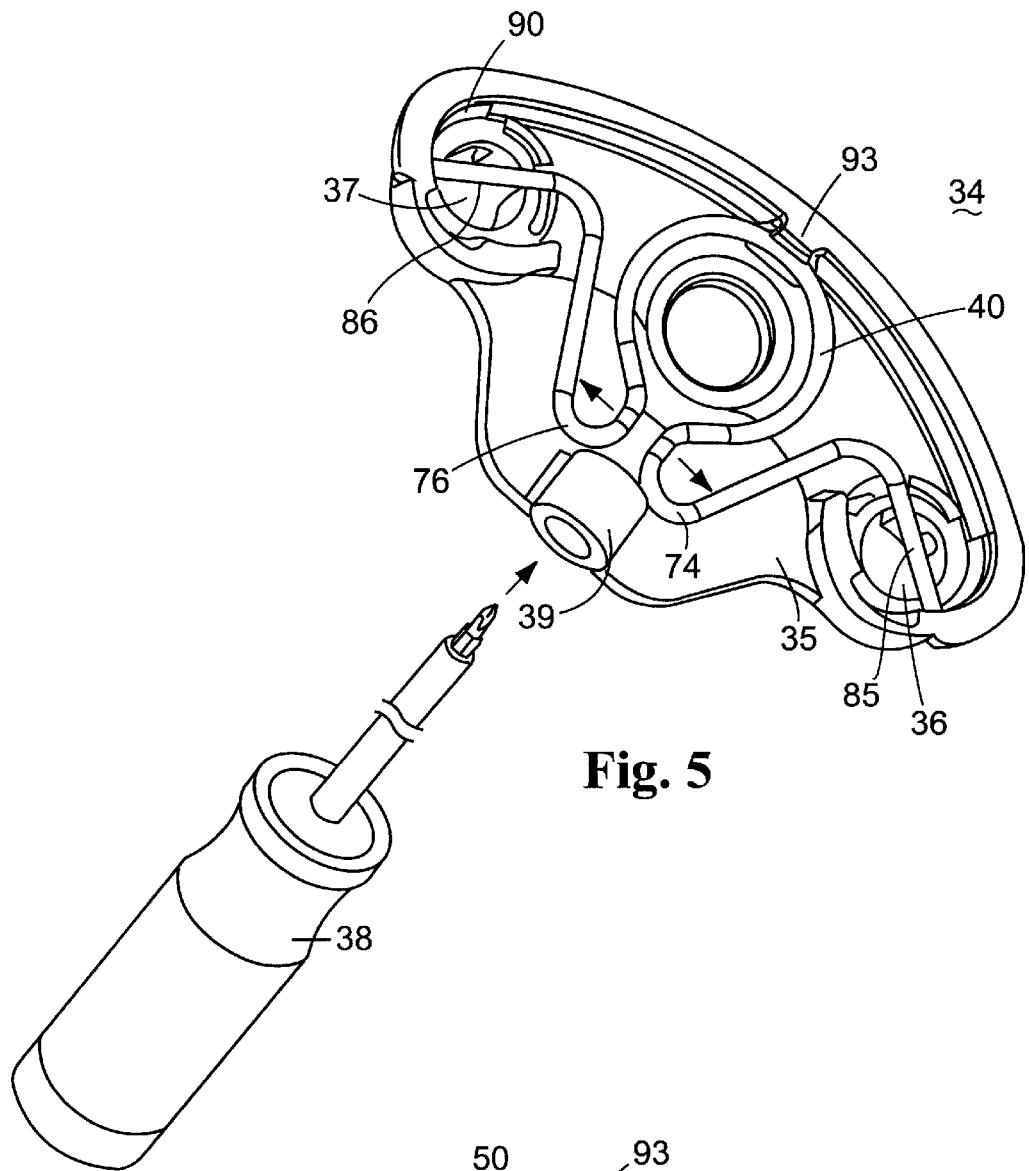
Figure 6:
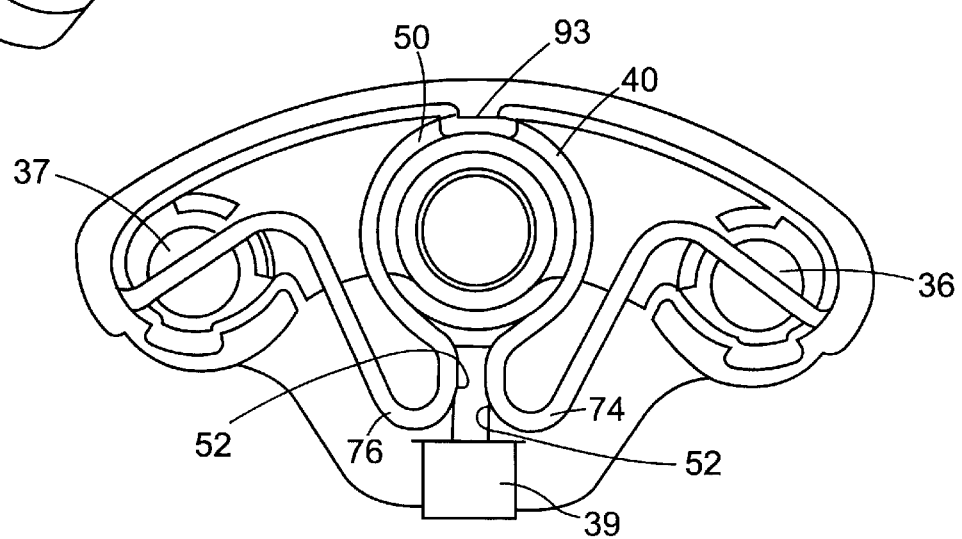

As best seen in FIGS. 4 and 5, the steering wheel armature 30 has four apertures 78 for receiving a corresponding snap-in attachment stud 32. These apertures 78 receive the retaining mechanism 34. The retainer mechanism 34 functions to hold a serpentine engagement wire 40, which functions to hold an air bag module subassembly 29 to the steering wheel armature 30. The retention mechanism 34 also provides an alignment guide 39 that is used with a disassembly tool 38 to remove the air bag module subassembly 29 from the steering wheel armature 30.

As best seen in FIGS. 5–8, each of the two retainer mechanisms 34 is defined by a base portion 35, which defines a pair of holes 36 and 37, which accept a pair of the snap-in attachment studs 32. Incorporated into the retainer mechanism 34 is a serpentine retention wire 40 that latches into grooves or notches 48a,b in the snap-in attachment studs 32. The retention mechanism 34 further has a tubular alignment guide 39, which functions to guide in a disassembly tool 38 and allow disengagement of the serpentine retention wire 40 from the snap-in attachment studs 32. The tool 38 (shown in FIG. 5), which can be a flat head or Phillips head screw driver, is inserted with the tubular alignment guide 39 and forces the lobes 74 and 76 of the wire 40 apart, which moves the locking portions 85 and 86 out from a respective groove 48a,b. The retention mechanisms 34 also include attachment tabs 88 that function to couple the retainer mechanism 34 to the steering wheel armature 30.

The snap-in attachment tabs 88 hold the retaining mechanisms 34 onto the steering wheel armature 30 and ensure the serpentine retention wire 40 is kept in position. Additionally, the retention mechanism 34 has a retention slot 90 cut into a flange portion 92. When the snap-in attachment stud 32 is pushed into the base portion holes 36 and 37, the angled ends of each stud move the serpentine retainer wire 40 perpendicular to the direction of insertion of the studs. The serpentine retainer wire 40 provides an increased overall free length. This increased length is an especially important advance over more straight retention wire attachment mechanisms in as much as it significantly increases the ease with which the module can be snapped into the wheel armature 30 during installation. The configuration allows the serpentine retention wire 40 to move at the two apertures 74 but gives the serpentine retention wire 40 enough springback to "capture" the engagement groove 48 of the snap-in attachment stud 32. In addition, the extending tab 93 in the flange portion 92 interacts with the retention wire loop 50 to prevent the wire from moving out of position during vibration. The tab 93 also prevents the wire 40 from sliding out of the retaining mechanism 34 unless a mechanic inserts the disengagement tool 38 with sufficient force that the locking portions 84 and 85 move out of the groove 48.

The configuration and function of the serpentine retention wire 40 are clearly distinguishable from other more linear retention wire mechanisms. The serpentine retention wire 40 is defined by its numerous bends, each bend enhancing the overall functionality of the serpentine retaining wire 40. As best seen in FIG. 5, the wire has a pair of locking portions 85 and 86, which function to engage the groove 48 in the snap-in attachments 32. The serpentine retention wire 40 is further characterized by a first large radius loop 50, which has an inner radius which is concave with respect to the disassembly tool 38. The first large radius functions as a spring, which brings the locking portions 85 and 86 in contact with the groove 48. The serpentine retention wire 40 also defines first and second lobe portions 74 and 76, which define a pair of disengagement surfaces 52. The first and second lobe portions 74 and 76 are located close enough to each other so that the insertion of a single disengagement tool will spread the disengagement surfaces 52 apart counteracting the spring force of the first large radius 50. The serpentine retention wire 40 also defines a second radius, which places the locking portions 85 and 86 of the serpentine retention wire over the center of the holes 36 and 37 in the base portion.

The retaining mechanisms 34 receive the snap-in attachment stud 32 of the air bag module subassembly 29 by initially displacing the ends or locking portions 85 and 86 of the serpentine retention wire 40 away from the center of the holes 36 and 37 in the base portion. As the snap-in attachment studs 32 are pushed through the openings 35 and 36 they slide past the locking portions 85 and 86 of the serpentine retention wire 40 and the locking portions 85 and 86 spread apart as the center loop 50 of the wire 40 is deformed. Once the groove 48 in the snap-in attachment stud 32 reaches the locking portions, the locking portions 85 and 86 snap into a corresponding groove 48 to retain the air bag module subassembly 29.

Should the module experience vibration following assembly, the configuration prevents both locking portions 85 and 86 from moving out of position during vibration at the same time. When a module is to be removed from the steering wheel armature 30, an operator inserts a tool 38 such as a normal screwdriver into the alignment guide 39, engaging and displacing the lobe portions 74, 76. When the operator inserts the tool 38, the serpentine retention wire 40 deforms at the retention wire loop 50 to cause disengagement of the locking portions 85 and 86, and snap-in attachment stud groove 48.

The steering wheel armature 30 has a recessed portion which allows for incorporation of the nut which mounts the steering wheel assembly to the steering column shaft and allows clearance for the connector necessary to ensure the inflator is electrically connected to the rest of the vehicle. This reduces the overall profile of the module/steering wheel assembly. In addition, a hole is provided to allow the inflator connector wire to be passed from the vehicle to the top of the steering wheel.

In the preferred embodiment, the module is of the "floating horn" type, which allows for actuating the vehicle's horn by depressing the entire module toward the steering wheel armature 30. The module is normally biased away from the steering wheel armature 30 by a plurality of coil springs 23, one disposed about a corresponding snap-in stud 32. As can be seen in FIG. 9a, the groove 48a has sufficient length to allow the module to move toward and away from the wheel armature to actuate the horn. The coil springs 23 function to push the module subassembly 29 away from the horn contacts on the steering wheel armature 30. The retention mechanism 34 functions as an electrical insulator, which allows the module to function as a horn switch. As such, the base portion of the retention mechanism 34 is formed of injection molded plastic such as nylon or polypropylene.

The steering wheel armature 30 of the steering wheel is provided with a flat surface 54 containing projections 55, which function as electrical contact points. The steering wheel armature 30 of the wheel further contains a recessed hole 56 immediately behind the module to allow installation of the inflator. The flat top surface 54 is important for the functioning of the module as it functions as a reaction surface and ensures the cushion 22 will always deploy towards the occupant. Another benefit of this flat surface 54 is that if the surface were not flat, the cushion 22 would be forced along an uneven surface and could snag.

FIG. 9b shows the snap-in attachment studs 32 of the current invention used in a non-floating module. This snap-in attachment stud 32 has a V-shaped groove 48b for engaging the serpentine wire 40 of the engagement mechanism 34. The shape of the groove is such that it locks the module into the wheel armature without letting it move relative to the wheel armature 30. In a non-floating module system, the retention mechanism 34 may be cast or formed integrally into the steering wheel armature 30.

It is to be understood that the invention is not limited to the exact construction illustrated and described above, but that various changes and modifications may be made without departing from the spirit and scope of the invention as defined in the following claims.

What is claimed is:

1. A steering wheel assembly having an armature and driver air bag module comprising:
    an inflator;
    a cushion;
    a mounting plate;
    a cover coupled to the mounting plate, said mounting plate having a plurality of snap-in attachment studs;
    at least one retaining mechanism disposed on said armature having a serpentine retention wire having a spring portion and at least two disengaging lobe portions whereby said serpentine retention wire lockably engages the snap-in attachment studs;
    and wherein the serpentine retention wire has a pair of locking portions and said disengaging lobe portions are adapted to be coupled to a disengagement tool.

2. The steering wheel assembly of claim 1 wherein the retaining mechanism has an alignment guide for guiding a disassembly tool.

3. The steering wheel assembly of claim 2 further including at least one retention means for regulating the amount of elastic deformation of the serpentine retention wire.

4. The steering wheel assembly of claim 1 wherein each of the locking portions of the serpentine retention wire engage a groove in a corresponding one of said snap-in attachment studs.

5. The steering wheel assembly of claim 1 wherein the retaining mechanism includes at least one pair of holes and a retention slot and wherein the locking portions are located adjacent the holes and within the slot.

6. A steering wheel having an assembly armature and driver air bag module assembly comprising:
- a mounting plate (31);
- a plurality of snap-in attachment studs disposed on the mounting plate;
- wherein the armature includes a plurality of apertures each for receiving one of the snap-in attachment studs;
- at least one retaining mechanism having a serpentine retention wire for lockably engaging the snap-in attachment studs;
- wherein the retention wire comprises a first pair of locking portions and a second pair of disengaging portions which are coupleable to a disengagement tool and wherein the retention wire is capable of being moved from an engaged position to a disengaged position.

7. The steering wheel assembly of claim 6 wherein the retaining mechanism has a base portion having a tool alignment guide.

8. The steering wheel assembly of claim 7 further including at least one retention means (90) for regulating the amount of elastic deformation of the serpentine retention wire (40) and preventing the wire from moving out of position during vibration.

9. The steering wheel assembly of claim 6 wherein each of the locking portions of the serpentine retention wire engage a groove in a corresponding one of said snap-in attachment studs.

10. The steering wheel assembly of claim 6 further comprising a cover, wherein the cover includes a central portion, the central portion having a tear seam disposed thereon.

11. The steering wheel assembly of claim 6 wherein the retaining further electrically insulates the module mounting plate from the wheel armature.

12. The steering wheel assembly of claim 6 wherein the at least one retaining mechanism includes two retaining mechanisms each having a serpentine retention wire for lockably engaging the snap-in attachment studs.

* * * * *